United States Patent Office 3,830,929
Patented Aug. 20, 1974

3,830,929
PROCESS FOR THE TREATMENT OF HYPERURICEMIA
Joseph Nordmann, Paris, Georges Dominique Mattioda, Enghien-les-Bains, Robert Alexandre Antoine Faure, Paris, and Gerard Paul Marie Henri Loiseau, Sceaux, France, assignors to Produits Chimiques Ugine Kuhlmann, Paris, France
No Drawing. Filed Apr. 11, 1973, Ser. No. 350,228
Int. Cl. A61k 27/00
U.S. Cl. 424—285    6 Claims

ABSTRACT OF THE DISCLOSURE

Process for the treatment of hyperuricemia which comprises administering a compound of the formula

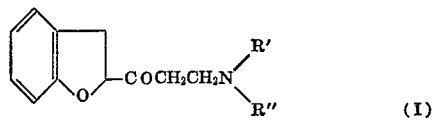

in which R' and R" each represent an alkyl group containing 1 to 5 carbon atoms or together with the nitrogen atom form a heterocyclic ring; or a pharmaceutically acceptable salt thereof.

---

The present invention concerns a process for the treatment of hyperuricemia.

A certain number of compounds is known of the general formula:

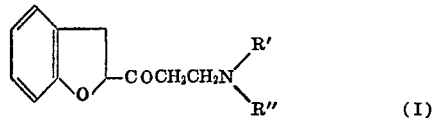

in which R' and R" represent alkyl groups containing 1 to 5 carbon atoms, which may be the same or different, or form with the nitrogen atom a heterocyclic ring for example the morpholino and piperidino rings possible containing another hetero-atom.

The compounds of formula (I) may be prepared, for example, by the Mannich reaction by condensation of 2-acetyl-benzofuran, in a solvent medium, with formaldehyde or a polymer of formaldehyde and a secondary amine (A. Burger et al., J. Am. Chem. Soc., 67, 566 (1945), E. B. Knott, J. Chem. Soc., 1190 (1947), F. Binon et al., Chimie therapeutique (1966), 5, 331). The alcohols derived therefrom have been studied for their analgesic properties.

It has now been found that the compounds of formula (I) and their mineral acid salts are inhibitors of xanthine-oxidase. Having regard to their anti-uric action they may be used in human therapeutics, for example for the treatment of gout and other syndromes connected with hyperuricemia.

The invention is illustrated by the following Examples, in which the parts are parts by weight unless the contrary is mentioned:

EXAMPLE 1

A mixture comprising 32 parts of 2-acetyl-benzofuran, 9 parts of trioxane and 20 parts of dimethylene hydrochloride and 0.4 parts of acetic acid is heated under reflux for 4 hours. It is then cooled and 250 parts by volume of acetone are added, when a crystalline product is precipitated. It is filtered off, then recrystallised from ethanol and 23 parts of 3 - N,N - dimethylamino-(2)-1-benzofuranyl-1-propanone hydrochloride of melting point 202° C. (Kofler) (literature: 203° C.) are thus obtained.

| Percentage analysis | Calculated (percent) | Found (percent) |
|---|---|---|
| C | 61.53 | 61.23 |
| H | 6.35 | 6.35 |
| N | 5.52 | 5.32 |
| Cl | 13.97 | 13.38 |

EXAMPLE 2

On operating under the conditions described in Example 1, but using 29.8 parts of piperidine hydrochloride, 25 parts of 3 - piperidino-(2)-1-benzofuranyl-1-propanone hydrochloride are obtained, of melting point 205° C. (Maquenne), literature: 202° C.

EXAMPLE 3

On operating as in Example 1, but with 30.7 parts of morpholine hydrochloride, 27 parts of 3-morpholino-(2)-1-benzofuranyl-1-propanone hydrochloride are obtained, of melting point 260° C. (Maquenne).

Toxicological and Pharmacological Properties

The acute toxicities of the products according to the invention, in the form of the hydrochlorides, have been determined on CD 1 mice by intravenous injection and taken orally. The LD 50 are shown in the following Table:

| $-N\begin{smallmatrix}R'\\R''\end{smallmatrix}$ | Cumulative quantal method LD 50, mg./kg. | |
|---|---|---|
| | Intravenous | Oral |
| Dimethylamino | 87 | 265. |
| Piperidino | | About 400. |
| Morpholino | | About 525. |

Their principal pharmacological property is represented by their anti-uric action. This property has been able to be shown by their inhibitive action on the xanthine-oxidase according to the following record:

(1) Preparation of the solution of enzyme

A suspension of xanthine-oxidase in a saturated solution of ammonium sulphate is used; the enzymic activity is about 3 u./ml. 0.1 ml. of this suspension is dissolved in 1 ml. of a buffer solution of pH 7.5.

(2) Preparation of the control experiment without inhibitor

To 5 ml. of a solution of xanthine (38 mg./litre and pH 7.5) are added 0.1 ml. of the enzyme solution.

(3) Preparation of the control experiment with inhibitor

To 2.5 ml. of a solution of xanthine (76 mg./litre and pH 7.5) are added successively a solution of inhibitor (pH 7.5) and 0.1 ml. of the enzyme solution.

During the whole of the experiment the test mixtures are maintained at 25° C. and the uric acid is determined at regular intervals of time by the Fleury method (Ann. Pharm. Franc., 23, 579–583 (1965). In order to express this activity, the coefficient $$A_{30} = \frac{UT}{UE}$$

is calculated, which represents the ratio of the rates of conversion into uric acid of the control test (UT) and the test in presence of inhibitor (UE), thirty minutes after the beginning of the reaction. When the activity is zero or very weak, the coefficient $A_{30}$ is near 1. It becomes greater as the inhibiting power is increased.

Under these conditions, the coefficients of activity $A_{30}$ are as follows:

| $-N\begin{matrix}R'\\R''\end{matrix}$ | Concentrations | Coefficient of activity |
|---|---|---|
| Dimethylamino | $10^{-3}$M | 25 |
|  | $2.10^{-4}$M | 23 |
|  | $4.10^{-5}$M | 7.7 |
|  | $8.10^{-6}$M | 4.1 |
| Piperidine | $2.10^{-4}$M | 10 |
|  | $4.10^{-5}$M | 5.8 |
| Morpholino | $10^{-3}$M | 18.4 |
|  | $2.10^{-4}$M | 16.8 |
|  | $4.10^{-5}$M | 11 |

Therapeutic Application

The products according to the invention may be used in human therapeutics for example with a pharmameutically acceptable carrier in particular for the treatment of gout and other syndromes connected with hyperuricemia, for example in the form of compressed tablets, gelatin-coated pills, cachets and injectable ampoules containing doses of 15 to 150 mg. of active product and at the rate of about 100 mg. to about 1000 mg. per day.

We claim:
1. The process for the treatment of hyperuricemia in a patient which comprises administering thereto 100 mg. to 1000 mg. per day of a compound of the formula:

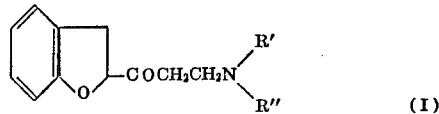
(I)

in which R' and R'' each represent an alkyl group containing 1 to 5 carbon atoms; or a pharmaceutically acceptable salt thereof.

2. The process of Claim 1, wherein R' and R'' are identical to each other.

3. The process of Claim 1, wherein R' and R'' are different from each other.

4. The process of Claim 1, wherein the compound is administered in admixture with a pharmaceutically acceptable carrier.

5. The process of Claim 4, wherein the compound is administered in the form of a compressed tablet, gelatin-coated pill cachet or injectable ampul.

6. The process of Claim 1 wherein the compound is administered in doses of 15 mg. to 150 mg.

References Cited

J.A.C.S., 67, 566–569, (1945).

ALBERT T. MEYERS, Primary Examiner

F. E. WADDELL, Assistant Examiner

U.S. Cl. X.R.

424—248, 267.